United States Patent
Chen et al.

(10) Patent No.: US 12,372,159 B2
(45) Date of Patent: Jul. 29, 2025

(54) THERMAL MANAGEMENT SYSTEM AND VALVE THEREOF

(71) Applicant: JOHNSON ELECTRIC INTERNATIONAL AG, Murten (CH)

(72) Inventors: Anbang Chen, Shen Zhen (CN); Tao Qu, Shenzhen (CN); Xiaohe Tao, Shenzhen (CN); Dong Wang, Shenzhen (CN); Yong Zhao, Shenzhen (CN); Xiaoyu Liu, Shen Zhen (CN); Haitao Wang, Shenzhen (CN); Ruifeng Qin, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 18/757,381

(22) Filed: Jun. 27, 2024

(65) Prior Publication Data
US 2024/0344620 A1     Oct. 17, 2024

Related U.S. Application Data

(63) Continuation of application No. PCT/CN2022/125561, filed on Oct. 17, 2022.

(51) Int. Cl.
*F16K 11/074* (2006.01)
*B60L 58/26* (2019.01)
(Continued)

(52) U.S. Cl.
CPC .......... *F16K 11/0743* (2013.01); *B60L 58/26* (2019.02); *B60L 58/27* (2019.02); *F16K 27/044* (2013.01)

(58) Field of Classification Search
CPC .... F16K 11/0743; F16K 27/044; B60L 58/27; B60L 58/26
See application file for complete search history.

(56) References Cited

U.S. PATENT DOCUMENTS 3,889,878 A * 6/1975 Evans .................. F16K 11/074
                                              237/8 R
4,705,627 A * 11/1987 Miwa .................... F16K 11/074
                                              210/264

(Continued)

FOREIGN PATENT DOCUMENTS

| CA | 3094865 A1 | 4/2021 |
|---|---|---|
| CN | 113374893 A | 9/2021 |

(Continued)

OTHER PUBLICATIONS

European Search Report from Corresponding EP Application No. 22962278.2 Dec. 13, 2024.

*Primary Examiner* — Raheena R Malik
(74) *Attorney, Agent, or Firm* — Aird & McBurney LP

(57) ABSTRACT

The patent discloses a thermal management system and a valve thereof. The valve comprises a valve house and a valve core that can be rotatably mounted in the valve house. A plurality of inner valve ports and a plurality of outer valve ports are defined in an axial end of the valve house. The inner valve ports and the outer valve ports are arranged at intervals along the circumference of valve house. the valve core defines a plurality of inner flow channels and a plurality of outer flow channels extending through one of axial ends of the valve core. the inner flow channels are located at a radial inner side of the outer flow channels and are not in communication with each other inside the valve core. The inner flow channels are corresponding to the inner valve ports. The outer flow channels are corresponding to the outer valve ports. In response to the valve core rotating to different positions relative to the valve house, the inner flow channels selectively communicate with different inner valve ports, and the outer flow channel selectively communicate with different outer valve ports.

16 Claims, 16 Drawing Sheets

(51) Int. Cl.
*B60L 58/27* (2019.01)
*F16K 27/04* (2006.01)

(56) References Cited

U.S. PATENT DOCUMENTS

| | | | | |
|---|---|---|---|---|
| 5,529,026 | A * | 6/1996 | Kurr | B60H 1/00485 |
| | | | | 123/41.1 |
| 5,617,815 | A * | 4/1997 | Spies | F16K 11/0853 |
| | | | | 123/41.1 |
| 5,950,576 | A * | 9/1999 | Busato | F01P 7/16 |
| | | | | 137/625.46 |
| 6,012,488 | A * | 1/2000 | Nichols | F16K 11/0743 |
| | | | | 137/625.11 |
| 6,055,809 | A * | 5/2000 | Kishi | B63H 25/12 |
| | | | | 91/487 |
| 6,164,248 | A * | 12/2000 | Lehmann | F01P 7/16 |
| | | | | 123/41.1 |
| 6,539,899 | B1 * | 4/2003 | Piccirilli | F01P 7/167 |
| | | | | 123/41.1 |
| 6,912,849 | B2 * | 7/2005 | Inoue | E02F 9/2228 |
| | | | | 417/225 |
| 6,920,845 | B2 * | 7/2005 | Lelkes | F16K 11/074 |
| | | | | 123/41.01 |
| 10,036,302 | B2 * | 7/2018 | Watanabe | F01P 5/12 |
| 11,346,082 | B2 * | 5/2022 | Akami | E02F 9/2235 |
| 11,614,173 | B2 * | 3/2023 | Kim | F16K 31/061 |
| | | | | 137/625 |
| 11,890,559 | B2 * | 2/2024 | Lin | B01D 29/21 |
| 2004/0011879 | A1 | 1/2004 | Lorch | |
| 2005/0034688 | A1 | 2/2005 | Lelkes et al. | |
| 2010/0269936 | A1 * | 10/2010 | Tomita | G01N 30/20 |
| | | | | 137/625.46 |
| 2011/0067772 | A1 | 3/2011 | Minamizawa | |
| 2017/0152956 | A1 * | 6/2017 | Sansum | F16K 31/60 |
| 2021/0080027 | A1 | 3/2021 | Schoeneman | |
| 2022/0326197 | A1 * | 10/2022 | Otsubo | G01N 30/38 |
| 2023/0074313 | A1 * | 3/2023 | Mazaira | H01M 10/613 |

FOREIGN PATENT DOCUMENTS

| | | | | |
|---|---|---|---|---|
| CN | 215950468 U | | 3/2022 | |
| CN | 114517842 A | * | 5/2022 | B01D 29/668 |
| CN | 216692256 U | | 6/2022 | |
| CN | 114738511 A | | 7/2022 | |
| CN | 217539713 U | | 10/2022 | |
| JP | 2014185662 A | | 10/2014 | |
| JP | 2020180623 A | | 11/2020 | |

* cited by examiner

THERMAL MANAGEMENT SYSTEM AND VALVE THEREOF

CROSS REFERENCE TO RELATED APPLICATIONS

This non-provisional patent application is continuation application of PCT Application No. PCT/CN2022/125561, filed with the Chinese Patent Office on Oct. 17, 2022, which is incorporated herein by reference in their entirety.

FIELD OF THE INVENTION

This application relates to the field of heat exchange technology, in particular to a thermal management system and a valve thereof.

BACKGROUND

For electric vehicles, there are diverse thermal management demands for different parts, such as cooling the traction motor, cooling or heating the battery under different operating conditions, and cooling or heating the passenger cabinet during different seasons. Therefore, the thermal management system of electric vehicles includes multiple fluid circuits for heat exchange medium, such as motor fluid circuit, battery fluid circuit, passenger cabinet fluid circuit, etc., and under different working conditions, the heat exchange medium has different flow controlling requirement in each fluid circuit.

The flow direction of heat exchange medium in the fluid circuit is controlled by valves, but existing valves are difficult to fully satisfy the heat exchange demands of multiple fluid circuits and working conditions. This not only results in low heat exchange efficiency and serious waste of electrical energy, but also to some extent a limit of improvement of electric vehicle range, especially in special situations such as low temperature.

SUMMARY OF THE INVENTION

The present disclosure aims to provide a thermal management system and valve thereof that can effectively satisfy the heat exchange needs under various working conditions In one aspect, the present disclosure provides a valve including a valve house and a valve core rotatably mounted in the valve house. a plurality of inner valve ports and a plurality of outer valve ports are defined in an axial end of the valve house; the inner valve ports and the outer valve ports are arranged at intervals along the circumference of valve house; the inner valve ports are located on a radial inner side of the outer valve ports; the valve core defines a plurality of inner flow channels and a plurality of outer flow channels extending through one of axial ends of the valve core; the inner flow channels are located at a radial inner side of the outer flow channels, and are not in communication with each other inside the valve core, the inner flow channels are corresponding to the inner valve ports, the outer flow channels are corresponding to the outer valve ports; in response to the valve core rotating to different positions relative to the valve house, the inner flow channels selectively communicate with different inner valve ports, and the outer flow channel selectively communicate with different outer valve ports.

In another aspect, the present disclosure provides a thermal management system comprising a first fluid circuit, a second fluid circuit, a third circuit and the valve above, the first fluid circuit is connected to at least two of inner valve ports of the valve; the second fluid circuit is connected to at least two of the inner valve ports of valve, but different from the inner ports connected to the first fluid circuit; the third circuit is connected to at least two of the outer valve ports of the valve.

DETAILED DESCRIPTION OF THE PREFERRED EMBODIMENTS

Figure 1:
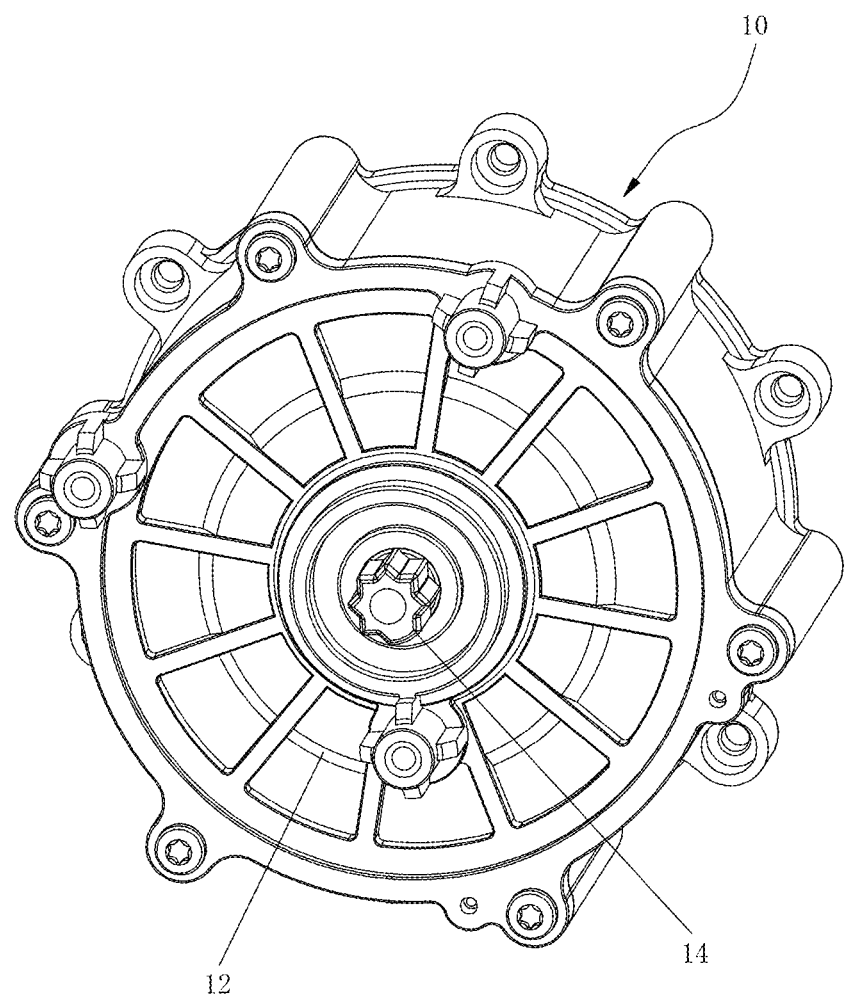
FIG. 1 is a perspective view of a valve according to a first embodiment of the present invention.

The present invention will be further described below based on the drawings and the embodiments.

FIGS. 1-5 show an embodiment of the valve 10 according to the present application. The valve 10 comprises a valve house 12 and a valve core 14 rotatably mounted in the valve house 12. The valve house 12 is provided with a plurality of inner valve ports and outer valve ports, to be connected to different fluid circuits of the thermal management system 100 respectively. The valve core 14 is provided with a plurality of inner flow channels and outer flow channels, for respectively interconnecting the corresponding inner valve ports and/or outer valve port of the valve house 12. With rotation of the valve core 14 relative to the valve house 12, the inner valve port and the outer valve port that the inner flow channel and the outer flow channel connected to are switched, and then the fluid circuits in interconnection are switched accordingly to enable the heat management system 100 to meet the heat exchange demand under various different working conditions. It should be understood that the valve 10 provided in the present application can be applied to control the flow of fluid in any fluid circuit and is not limited to the application in the thermal management system 100.

The valve house 12 is hollow cylindrical as a whole, and comprises a base plate 121, an annular side wall 123 that extends vertically from the outer edge of the base plate 121 and a cover plate 125 covered on the side plate 123. The base plate 121, the side plate 123, and the cover plate 125 are enclosed to define a space to receive the valve core 14. In one embodiment, the base plate 121 and the side wall 123 are integrally formed. The cover plate 125 is fixedly connected to the side wall 123 through screws and the like. The centre of the cover plate 125 forms a through-shaft hole 127 for assembling of the valve core 14. In the embodiment shown in the figure, the inner valve port and the outer valve port are defined in the base plate 121, that is, located at one axial side end of the valve house 12. The inner valve ports comprise a first inner valve port A1, a second inner valve port A2, a third inner valve port A3, a fourth inner valve port A4, a fifth inner valve port A5, and a sixth inner valve port A6. The outer valve ports comprise the first outer valve port B1, the second outer valve port B2, and the third outer valve port B3.

The valve core 14 is cylindrical as a whole and is notably installed in the valve house 12. A shaft 141 protrudes outwards from a side of the valve core 14 facing the cover plate 125 and extends out of the valve house 12 through the through-shaft hole 127 of the cover plate 125. A driving element, such as the motor, is in transmission connection with the shaft 141, to drive valve core 14 rotate relative to the valve house 12 to change the work states of the valve 10.

In the embodiment as shown in the figures, the valve core 14 is provided with a plurality of inner and a plurality of outer flow channels respectively extending through an axial end facing the base plate 121. The plurality of inner flow channels comprises a first inner flow channel C1 and a second inner flow channel C2; The plurality of outer flow channels comprises the first outer flow channel D1, the second outer flow channel D2, and the third outer flow channel D3. With the valve core 14 rotates to different positions relative to the valve house 12, the inner flow channel C1 and C2 selectively communicate with different inner valve ports A1~A6, and the outer flow channel D1~D3 selectively communicate with different outer valve ports B1~B3 on, so that the valve 10 presents different work states.

In some embodiments, a static friction ring 13 is arranged on an inner side of the cover plate 125, and the static friction ring 13 is arranged around the shaft rod 141 and is spaced apart from it. The valve core 14 is provided with a dynamic friction ring 15 at the side end facing the cover plate 125, and the dynamic friction ring 15 abuts against the static friction ring 13 in the axial upward direction of the valve 10. The static friction ring 13 is made of good wear-resistant, high-temperature resistant materials, such as ceramics or silicon carbide. The dynamic friction ring 15 is made of a lubricating material with good wear resistance and high temperature resistance, such as polytetrafluoroethylene (PTFE). By arranging the static friction ring 13 and the dynamic friction ring 15, the cover plate 125 and the valve core 14 are axially spaced, so that the friction between the cover plate 125 and the valve core 14 is effectively avoided during rotation. Preferably, an elastic part 16 is mounted between the valve core 14 and the dynamic friction ring 15, such as a wave spring, etc., to provide axial preload and urge the dynamic friction ring 15 and the static friction ring 13 to be tightly fitting with each other to form a dynamic seal. Because coolant may exist in the valve house 12 in some working conditions, the dynamic seal can avoid the coolant leaking through the gap between the shaft 141 and the valve house 12.

In some embodiments, a sealing gasket 17 is sandwiched between the base plate 121 and the valve core 14. The sealing gasket 17 is made of flexible material, such as silastic, etc., to avoid a direct friction between the valve core 14 and the base plate 121 during rotation, and a fluid leakage via the contact surface of the valve core 14 and the base plate 121. The sealing gasket 17 defines a plurality of openings corresponding to the inner valve ports A1~A6, the outer valve ports B1~B3 of the valve house 12 and the inner flow channels C1~C2 and the outer flow channels D1~D3 of the valve core 14, so as to avoid affecting the communication of the inner valve channel C1~C2 and the outer flow channel D1~D3 to the inner valve port A1~A6 and the outer valve port B1~B3. In addition, a sealing piece 18 is mounted around a peripheral surface of the dynamic friction ring 15. Sealing rings 19 are respectively arranged between the shaft 141 and the cover plate 125, and the cover plate 124 and the side plate 123 to enable sealing between every two assembled two various parts of the valve 10. The fluid flows into the valve 10 via a certain one of the inner valve ports A1~A6 and outer valve ports B1~B3 can only flow out of the valve via a desired another one of the inner valve ports A1~A6 and outer valve ports B1~B3.

Figure 6:
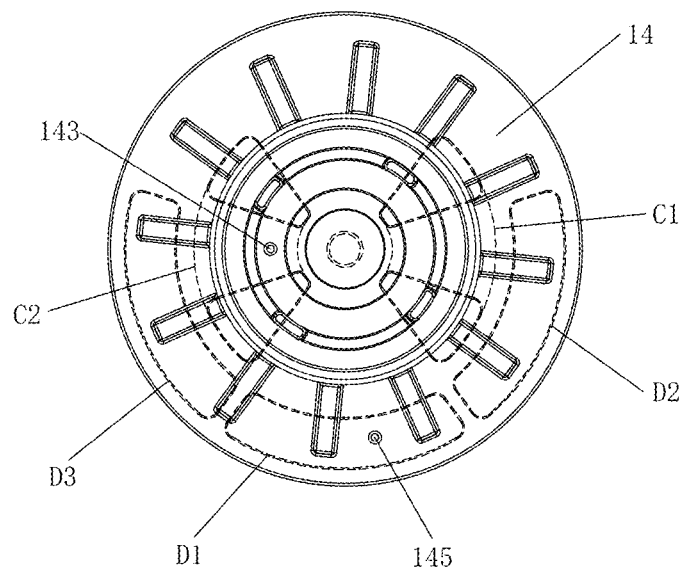
FIG. 6 is a top plan view of the valve core shown in FIG. 2.
Figure 7:
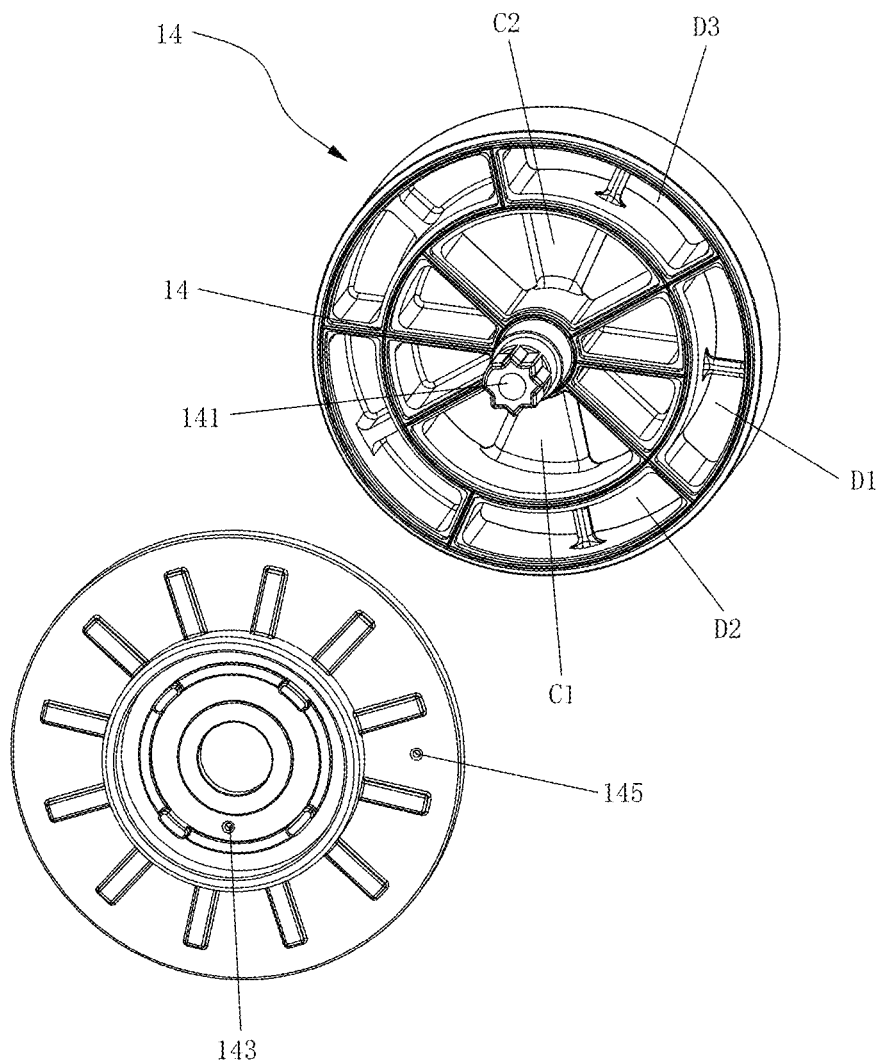
FIG. 7 is a further exploded view of the valve core shown in FIG. 2.
Figure 8:
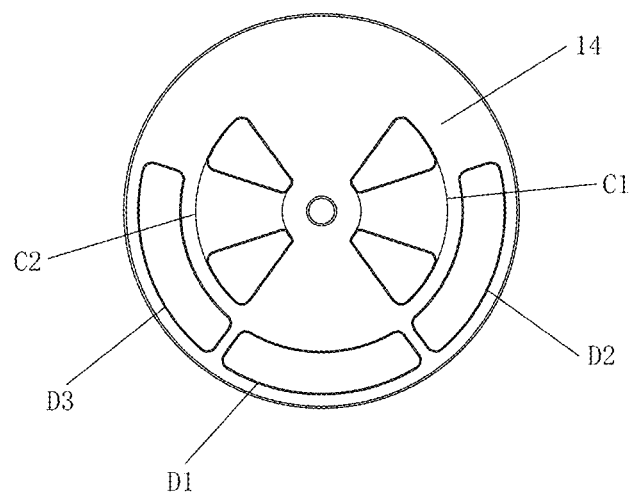
FIG. 8 is a schematic diagram of the flow channel of the valve core of FIG. 7.

Please refer also to FIG. 6 to FIG. 8, the first inner flow channel C1 and the second inner flow channel C2 of the valve core 14 are arranged on a circle and are roughly symmetrical to each other. Each of the first and second inner flow channels C1 and C2 spans a central angle slightly greater than 90 degrees. Each of two interval areas between the first and second inner flow channels C1 and C2 spans a central angle slightly less than 90 degrees. The first outer flow channel D1, the second outer flow channel D2, and the third outer flow channel D3 are arranged on a circle and have same shape and size for each of them. A diameter of the circle where the inner flow channel C1 and C2 are located is smaller than the inner diameter of the circle where outer flow channel D1~D3 are located. That is to say, the first outer flow channel D1, the second flow channel D2, and the third flow channel D3 are located on the radial outer side of the first inner flow channel C1 and the second inner flow channel C2.

In the embodiment as shown in the figures, the first outer flow channel D1 is located between the second outer flow channel D2 and the third outer flow channel D3. The second outer flow channel D2 is positioned closed to an outer side of the first inner flow channel C1; The third outer flow channel D3 is located closed to an outside of the second outer flow channel D2.

Figure 2:
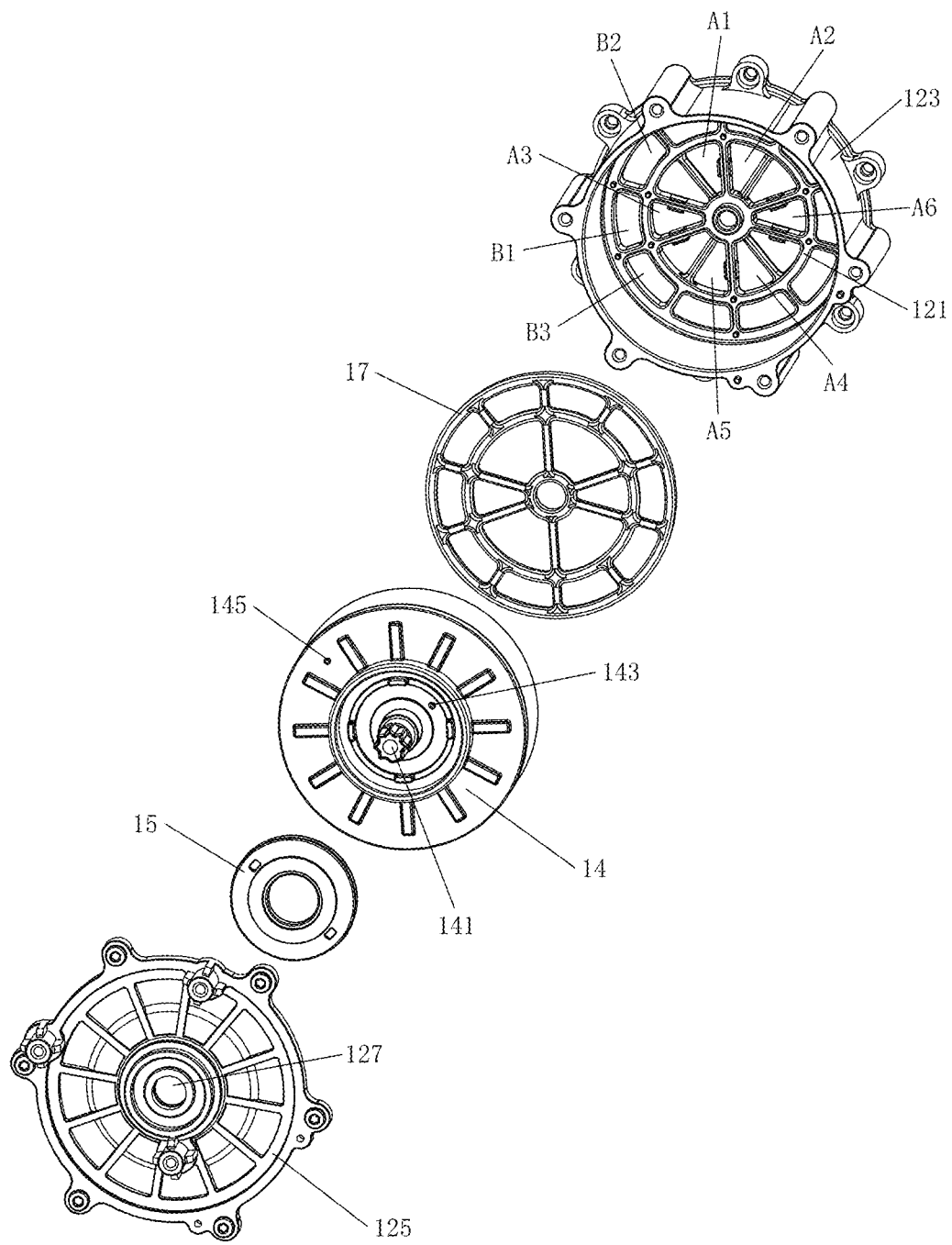
FIG. 2 is an exploded view of the valve shown in FIG. 1.
Figure 3:
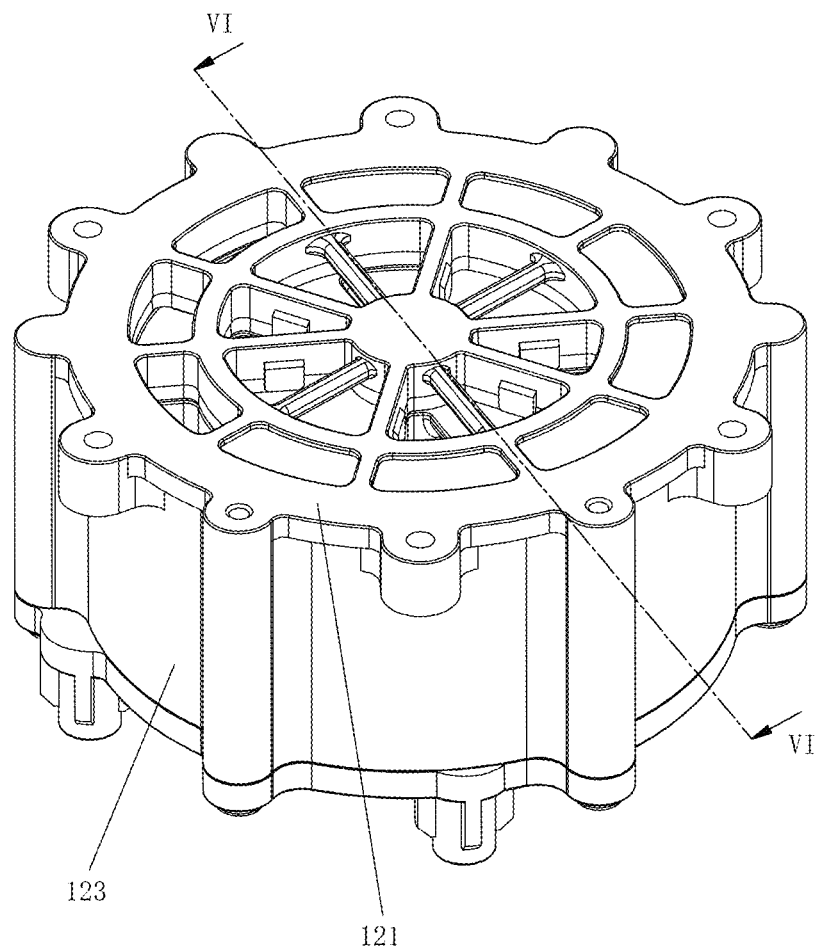
FIG. 3 is another perspective view of the valve in FIG. 1 shown in a different aspect.
Figure 4:
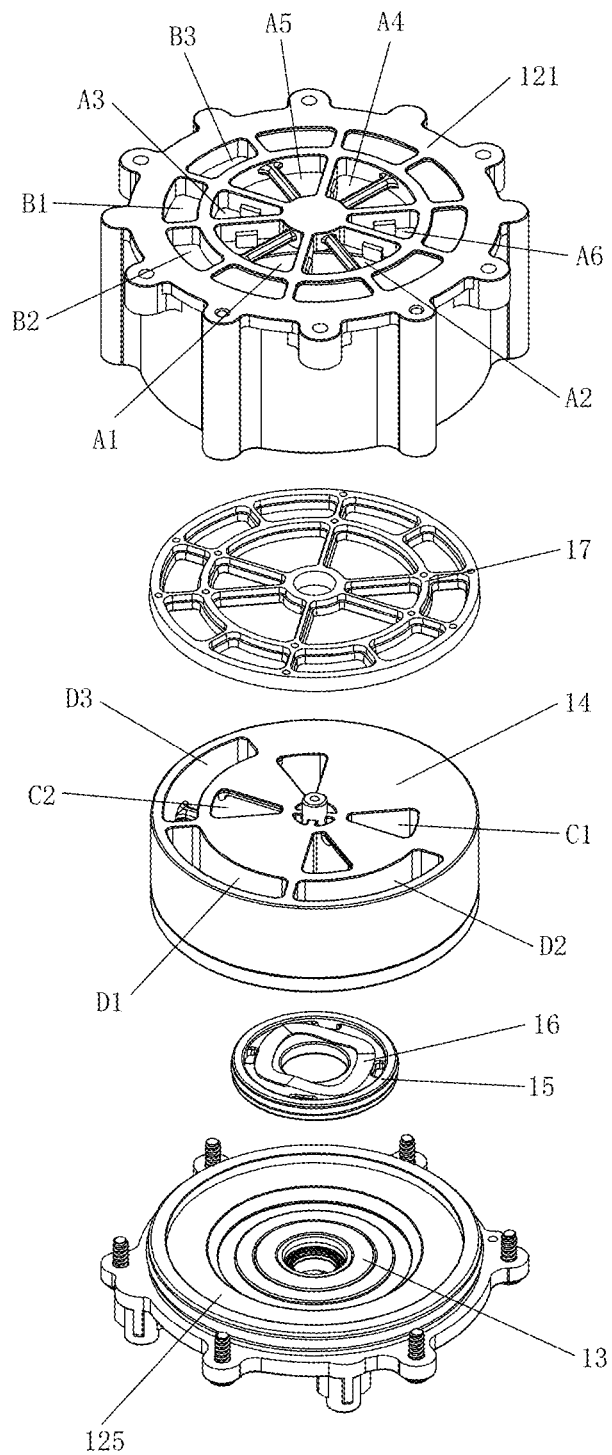
FIG. 4 is an exploded view of the valve shown in FIG. 3.
Figure 5:
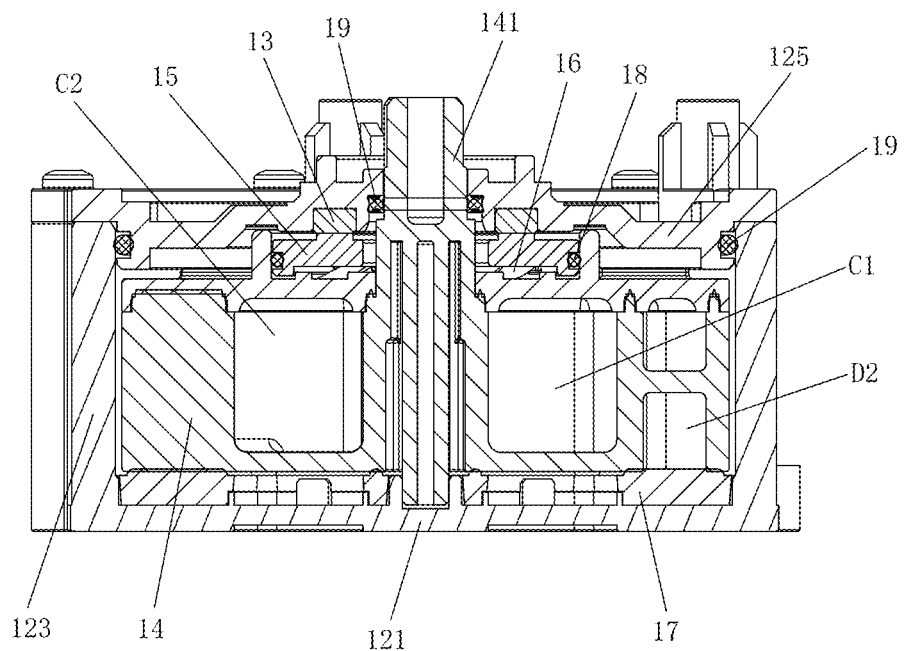
FIG. 5 is a cross-sectional view of FIG. 3 along line V-V.

In some embodiments, as shown in FIG. 2 and FIG. 6, the valve core 14 is provided with a first air hole 143 and a second air hole 145 at a side end facing the cover plate 125. The first air hole 143 is located on the circle where the inner flow channel C1 and C2 are located and communicates with the second inner flow channel C2, and plays a role of balancing air pressure inside the inner flow channel C1, C2 and the inner valve ports A1~A6 that they are in communication with; The second air hole 145 is located on the circle where the outer flow channels D1~D3 is located and communicates with the first outer flow channel D1, and help to balance air pressure inside the outer flow channels D1~D3 and the external valve ports B1~B3 that they are in communication with. Therefore, the heat exchange medium can flow smoothly through the valve 10. In other embodiments, the first air hole 143 can also communicates with the first inner flow channel C1, and the second air hole 145 can communicates with the second outer flow channel D2 or the third outer flow channel D3.

Figure 9:
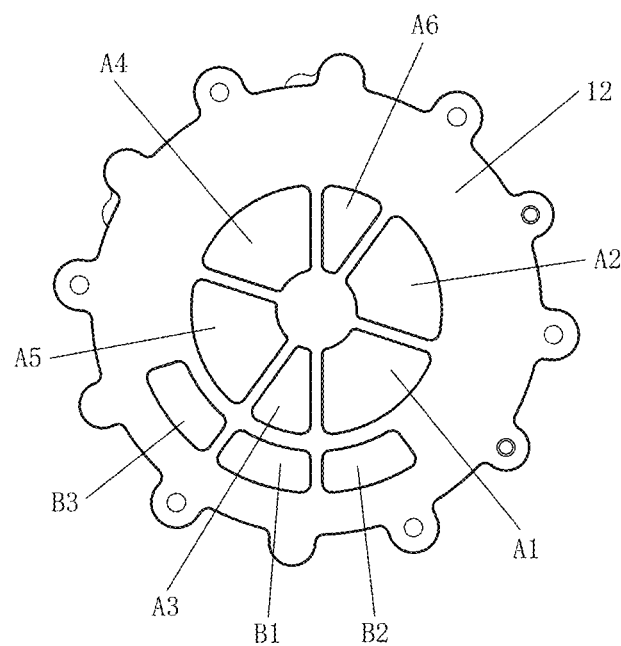
FIG. 9 is a schematic diagram showing the valve ports defined in the valve house of the valve shown in FIG. 2.

Please also refer to FIG. 9, the first inner valve port A1, the second inner valve port A2, the third inner valve port A3, the fourth inner valve port A4, the fifth inner valve port A5, the sixth inner valve port A6 are located on a circle and arranged closely one by one along a circumferential direction. The first outer valve port B1, the second outer valve port B2, and the third outer valve port B3 are located on a circle and arranged closely one by one along a circumferential direction. In one embodiment, each inner valve port A1~A6 and each outer valve port B1~B3 is sector-annular, and the outer diameter of each inner valve port A1~A6 is smaller than an inner diameter of each outer valve port B1~B3. In other words, the first inner valve port A1, the second inner valve port A2, the third inner valve port A3, the fourth inner valve port A4, the fifth inner valve port A5, the sixth inner valve port A6 are located on the radial inner side of the first outer valve port B1, the second outer valve port B2, and the third outer valve port B3.

In the embodiment shown in the figures, the first inner valve port A1 is arranged between the second and third inner valve ports A2 and A3, the fourth inner valve port A4 is arranged between the fifth and sixth inner valve ports A5 and A6, the second and sixth inner valve ports A2 and A6 are arranged adjacently, and the third and fifth inner valve ports A3 and A5 are arranged adjacently. The widths of the first, second, fourth, and fifth inner valve ports A1, A2, A4, and A5 in the circumferential direction are almost equal; The widths of the third and sixth inner valve ports A3 and A6 in the circumferential direction are almost equal, and are smaller than the widths of the first, second, fourth and fifth inner valve ports A1, A2, A4 and A5 in the circumferential direction. In one embodiment, each of the first, second, fourth, and fifth inner valve ports A1, A2, A4, and A5 spans a central angle of about 72°; Each of the third and sixth inner valve ports A3 and A6 spans a central angle of about 36°.

In the embodiment as shown in the figures, the widths of the first, the second and the third outer valve ports B1~B3 in a circumferential direction are almost independent. The first outer valve port B1 is located between the second outer valve port B2 and the third outer valve port B3. In the radial direction, the first outer valve port B1 is almost aligned with the third inner valve port A3. The second outer valve port B2 is almost aligned with the first inner valve port A1. The third outer valve port B3 is arranged almost aligned with the fifth inner valve port A5. In one embodiment, each of the first, second and third outer valve ports B1~B3 spans a central angle of about 36°.

In one embodiment, each inner flow channel C1 and C2 is sector-annular, with an inner diameter equal to the inner diameter of each inner valve port A1~A6, and an outer diameter equal to the outer diameter of each inner valve port A1~A6. On a projection along an axial direction, each inner flow channel C1 and C2 and each inner valve port A1~A6 are located on a same circle. The widths of the first and second inner flow channels C1 and C2 in the circumferential direction is equal and are greater than the width of each inner valve port A1~A6. Therefore, each inner flow channel C1 and C2 can be aligned with and then in fluid communication with at least two adjacent inner valve ports A1~A6 at the same time. In one embodiment, each of the first and second inner flow channels C1 and C2 spans a central angle of about 108°. Then, the width in the circumferential direction of each of the first and second inner flow channels C1 and C2 are about 1.5 times that of the first, second, fourth and fifth inner valve ports A1, A2, A4 and A5, and about 3 times that of the third and sixth inner valve ports A3 and A6.

Each outer flow channel D1~D3 is sector-annular, with an inner diameter equal to the inner diameter of each outer valve port B1~B3, and an outer diameter equivalent to the outer diameter of each outer valve port B1~B3. On a projection along an axial direction, each outer flow channel D1~D3 and each outer valve port B1~B3 are located on a same circle. The widths of the first, second and third outer flow channels D1~D3 in a circumferential direction are equal and are greater than the width of each external valve port B1~B3 in the circumferential direction. Therefore, each outer flow channel D1~D3 can be aligned with and then in fluid communication with at least two adjacent outer valve ports B1~B3 at the same time. In one embodiment, each of the first, second and third outer flow channels D1~D3 spans a central angle of about 72°. Then, the circumferential width in a circumferential direction of each of the first, second and third outer flow channels D1~D3 is about 2 times that of each external valve port B1~B3.

It can be understood that since the inner valve port A1~A6 and the outer valve port B1~B3 are sector-annular, and each of the inner flow channel C1, C2 and the outer flow channel D1~D3 are sector-annular, so the above-mentioned an equality of widths in circumferential direction means that an equality of corresponding central angle, and the multiple of the widths are also the multiple of the corresponding central angle.

The valve 10 can be switched among different work states by rotation of the valve core 14 relative to the valve house 12. For example, the valve core 14 can be rotated to selectively enable the first inner valve port A1 to be interconnected with the adjacent second inner valve port A2 through the first internal flow channel C1, or to be interconnected the adjacent third inner valve port A3, or to be interconnected to both of the second inner valve port A2 and the third inner valve port A3 at the same time. It should be understood that the valve core 14 can rotate in the range of 360 degrees relative to the valve house 12, and the following is only explained in several commonly used states of the valve 10.

Figure 10:
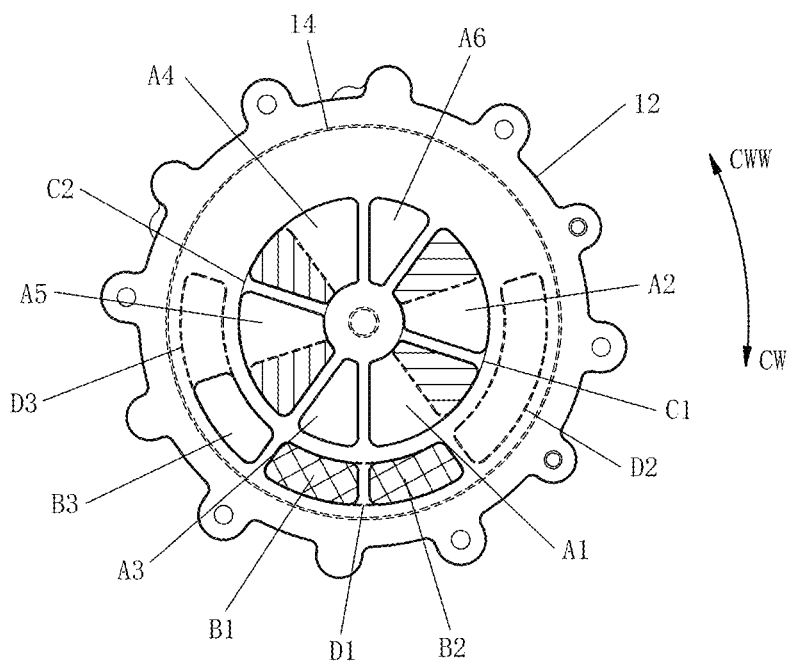
FIG. 10 is a schematic diagram to illustrate the position relationship between the valve core and valve house in the first work state of the valve.

Refer to FIG. 10, when the valve core 14 is rotated to a first position relative to the valve house 12, the valve 10 is in a first work state. The first inner flow channel C1 is aligned and in communication with both of the first and second inner valve ports A1 and A2; The second inner flow channel C2 is aligned and in communication with both of the fourth and fifth inner valve ports A4 and A5; The first outer flow channel D1 is aligned and in communication with both of the first and second outer valve ports B1 and B2. In one embodiment, the first position can be deemed as the initial position of the valve 10, and the first work state is the initial state of the valve 10. In order to facilitate the comparison of the positions of the valve house 12 and the valve core 14, in FIG. 10-16, solid lines represent the valve house 12, and the dashed lines represent the valve core 14.

Figure 11:
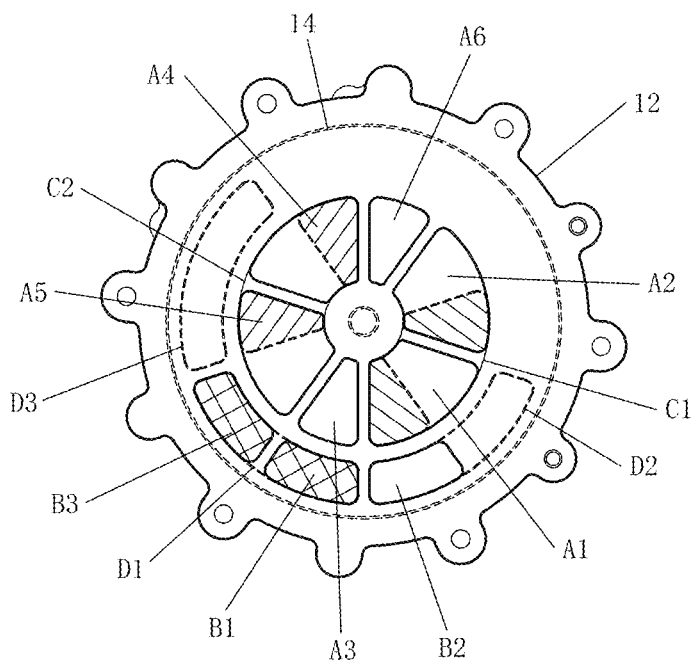
FIG. 11 is a schematic diagram to illustrate the position relationship between the valve core and valve house in the second work state of the valve.

Refer to FIG. 11, when the valve core 14 is rotated at a certain angle (e.g. 36° along the CW direction in the figure) from the initial position with respect to the valve house 12 to a second position, the valve core 14 is in a second work state. The first inner flow channel C1 is aligned and in communication with both of the first and second inner valve ports A1 and A2; The second inner flow channel C2 is aligned and in communication with both of the fourth and fifth inner valve ports A4 and A5; The first outer flow channel D1 is aligned and in communication with both of the first and third outer valve ports B1 and B3. That is, in the second work state, the connection among the outer valve port B1~B3 are changed as compared to that in the first work state.

Figure 12:
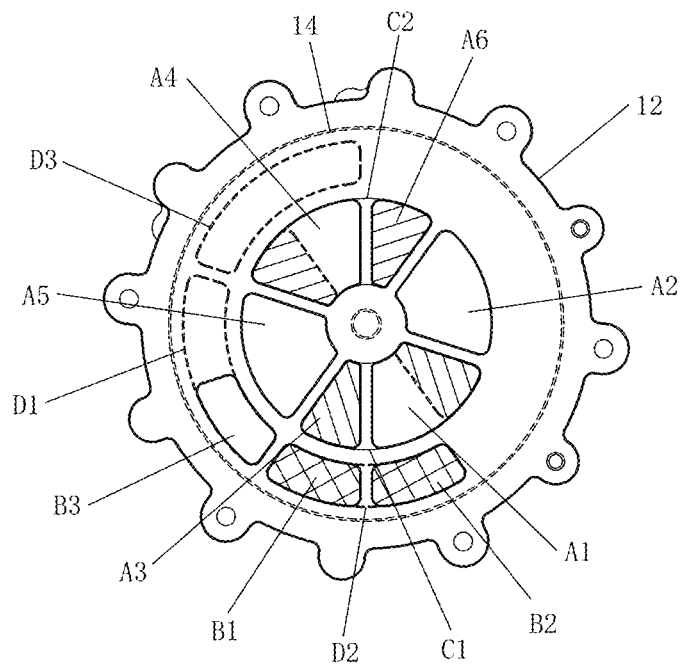
FIG. 12 is a schematic diagram to illustrate the position relationship between the valve core and valve house in the third work state of the valve.

Refer to FIG. 12, when the valve core 14 is rotated at 72 degrees from the initial position along the CW direction in the figure with respect to the valve house 12 to a third position, the valve 10 is in the third work state. The first inner flow channel C1 is aligned and in communication with both of the first and third inner valve ports A1 and A3; The second inner flow channel C2 is aligned and in communication with both of the fourth and sixth inner valve ports A4 and A6; The second outer flow channel D2 is aligned and in communication with both of the first and second outer valve ports B1 and B2. That is, in the third work state, the connection situation among inner valve port A1~A6 and outer valve port B1~B3 are all changed as compared to that in the first work state.

Figure 13:
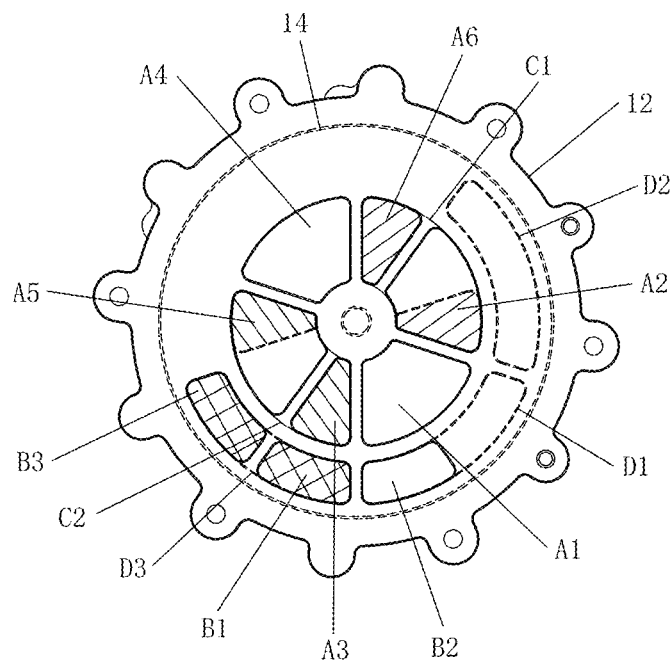
FIG. 13 is a schematic diagram to illustrate the position relationship between the valve core and valve house in the fourth work state of the valve.

Refer to FIG. 13, when the valve core 14 is rotated at 36 degrees from the initial position along the CCW direction in the figure with respect to the valve house 12 to a fourth position, the valve 10 is in a fourth work state. The first inner flow channel C1 is aligned and in communication with both of the second and sixth inner valve ports A2 and A6; The second inner flow channel C2 is aligned and in communication with both of the third and fifth inner valve ports A3 and A5; The third outer flow channel D3 is aligned and in communication with both of the first and third outer valve ports B1 and B3. That is, in the fourth work state, the conduction situation of inner valve port A1~A6 and outer valve port B1~B3 changes again. In some embodiments, when the valve 10 is in the fourth work state, the thermal management system 100 is in a non-functional state.

Figure 14:
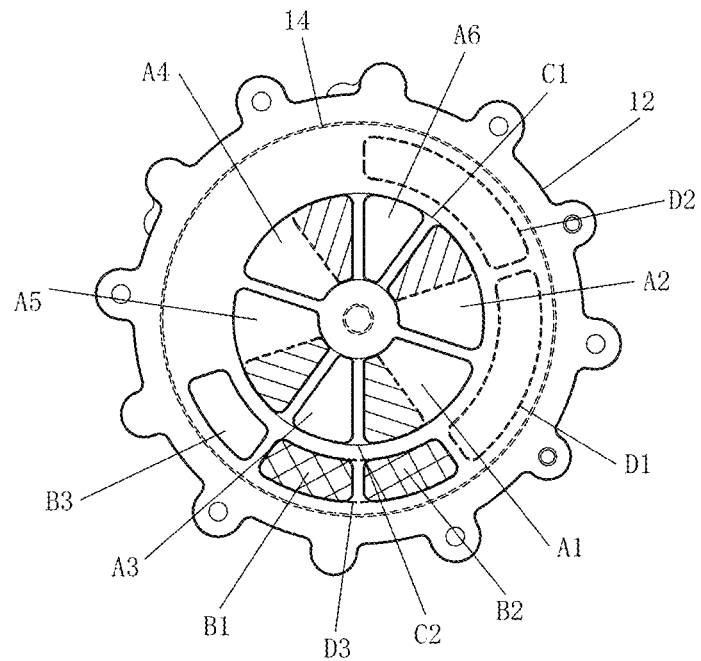
FIG. 14 is a schematic diagram to illustrate the position relationship between the valve core and valve house in the fifth work state of the valve.

Refer to FIG. 14, when the valve core 14 is rotated at 72 degrees from the initial position along the CCW direction in the figure with respect to the valve house 12 to a fifth position, the valve 10 is in a fifth work state. The first inner flow channel C1 is aligned and in communication with both of the second and fourth inner valve ports A2 and A4. The second inner flow channel C2 is aligned and in communication with both of the first and fifth inner valve ports A1 and A5; The third outer flow channel D3 is aligned and in communication with both of the first and second outer valve ports B1 and B2. In the fifth work state, the connection situation of inner valve port A1~A6 and outer valve port B1~B3 are further changed.

When the valve 10 is in the aforementioned work states, the corresponding valve ports are connected one to one. It should be understood that the valve core 14 can also be rotated to any position between every two of the first position, the second position, the third position, the fourth position, the fifth position.

Figure 15:
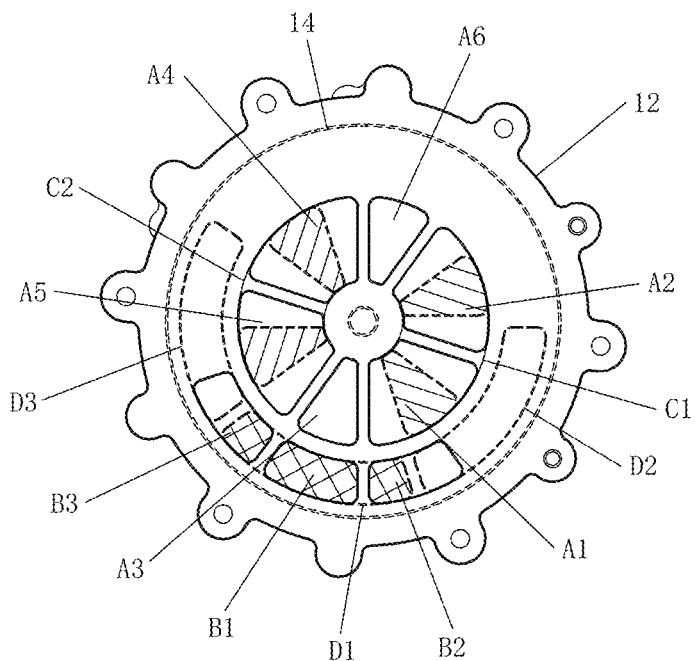
FIG. 15 is a schematic diagram to illustrate the position relationship between the valve core and valve house in the sixth work state of the valve.

Refer to FIG. 15, when the valve core 14 is rotated at a certain angle (such as rotating 18° along the CW direction in the figure from the first position) relative to the valve house 12 to a sixth position between the first position and the second position, the valve 10 is in the sixth work state. The first inner flow channel C1 is aligned and in communication with both of the first and second inner valve ports A1 and A2; The second inner flow channel C2 is aligned and in communication with both of the fourth and fifth inner valve ports A4 and A5; The first outer flow channel D1 is aligned and in communication with the first, second and third outer valve ports B1, B2 and B3 simultaneously. In the sixth work state, the connection among the inner valve ports A1~A6 are one-to-one, and the connection among the outer valve port B1~B3 are one-to-many.

Figure 16:
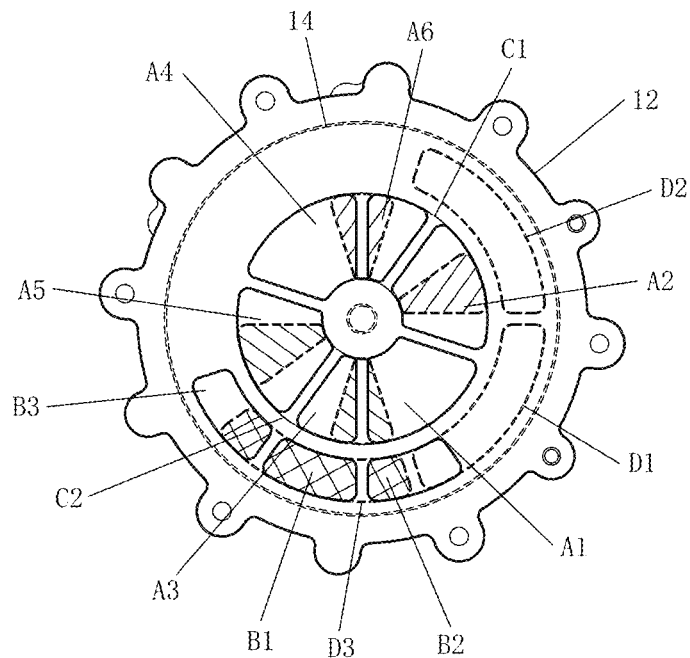
FIG. 16 is a schematic diagram to illustrate the position relationship between the valve core and valve house in the seventh work state of the valve.

Refer to FIG. 16, when the valve core 14 rotates at a certain angle (such as rotating 54° along the CCW direction in the figure from the first position) relative to the valve house 12 to a seventh position between the fourth position and the fifth position, the valve 10 is in a seventh work state. The fourth inner valve port A4 is connected to both of the second and sixth inner valve ports A2 and A6 simultaneously via the first inner flow channel C1; The first inner valve port A1 is connected to both of the third and fifth inner valve ports A3 and A5 simultaneously via the second inner flow channel C2; The third outer flow channel D3 is aligned and in communication with all of the first, second and third outer valve ports B1, B2 and B3. In the seventh work state, the connection among the inner valve ports A1~A6 is one-to-many conduction, and the connection among the outer valve port B1~B3 are one-to-many.

Figure 17:
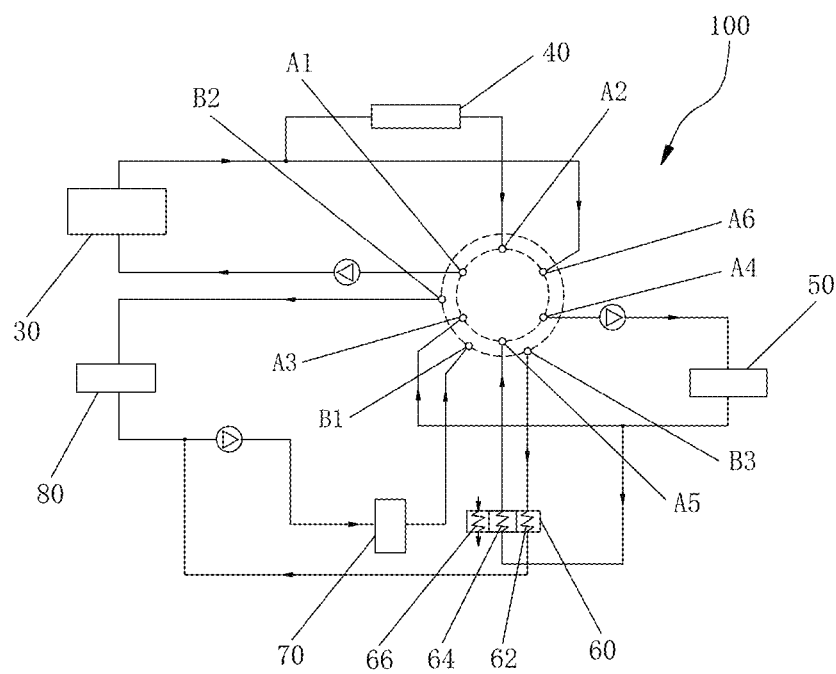
FIG. 17 is a schematic diagram of a thermal management system according to a first embodiment of the present invention.

Please refer to FIG. 17, the valve 10 provided in this application can be applied to a thermal management system 100 with a plurality of fluid circuits, for a control of the flow of the heat exchange medium in each of the circuits.

In one embodiment, the thermal management system 100 is used in an electric vehicle, and includes a first fluid circuit, a second fluid circuit, a third fluid circuit, wherein the first fluid circuit can be an electric drive cooling circuit, the second fluid circuit can be a battery heat-exchange circuit, and the third circuit can be a passenger cabinet temperature-adjustment circuit. The electric drive cooling circuit includes a first pump, a traction motor 30, a radiator 40 that are connected in series through pipelines; The battery heat-exchange circuit includes a second pump, a battery 50, a chiller 60 that are connected in series through pipelines; The passenger cabinet temperature-adjustment circuit includes a third pump, a heater 70, a blower warming core 80 that are connected in series through pipelines. The heater 70 is preferably a PTC heater. It should be understood that each circuit may be equipped with sensors, check valves, etc., which are not shown in the drawings for the sake of simplification.

In the electric drive cooling circuit, an inlet of the traction motor 30 is defined as a first inlet of the first fluid circuit and is connected to the first inner valve port A1 of the valve 10 through the first pump. An outlet of radiator 40 is defined as a first outlet of the first fluid circuit and is connected to the second inner valve port A2 of valve 10; A first tee joint is arranged between an outlet of traction motor 30 and an inlet of radiator 40. The first tee joint has an input port and two output ports. The input port is connected to the outlet of traction motor 30. One of the output ports is connected to the inlet of radiator 40. The other one output port is connected to the sixth inner valve port A6 of valve 10. Therefore, a first heat exchange medium loop passing through the traction motor 30 and the radiator 40 is formed via the first and second inner valve ports A1 and A2; A second heat exchange medium loop passing through the traction motor 30 is formed via the first and sixth inner valve ports A1 and A6.

In the battery heat-exchange circuit, an inlet of the battery 50 is defined as a second inlet of the second fluid circuit and is connected to the fourth inner valve port A4 of the valve 10 through the second pump; An outlet of chiller 60 is defined as a second outlet of the second fluid circuit is connected to the fifth inner valve port A5 of valve 10; A second tee joint is arranged between an outlet of battery 50 and an inlet of chiller 60. The second tee joint has an input port and two output ports. The input port is connected to the outlet of battery 50. One of the output ports is connected to the inlet of chiller 60. The other one output port is connected to the third inner valve port A3 of valve 10. Therefore, a third heat exchange medium loop passing through the battery 50 and the chiller 60 is formed via the fourth and fifth inner valve ports A4 and A5; A fourth heat exchange medium loop passing the battery 50 is formed via the fourth and third inner valve ports A4 and A3.

In the passenger cabinet temperature-adjustment circuit, an inlet of the blower warming core 80 is defined as a third inlet of the third circuit and is connected to the second outer valve port B2 of the valve 10, An outlet of heater 70 is defined as a third outlet of the third circuit and is connected to the first outer valve port B1 of the valve 10; A third tee joint is arranged between an outlet of the blower warming core 80 and an inlet of the heater 70. The third tee joint has two input ports and an output port. One of the input ports is connected to the outlet of the blower warming core 80; The other one input port is connected to the third outer valve port B3 of the valve 10 through chiller 60. The output port is connected to the inlet of the heater 70. Therefore, a fifth heat exchange medium loop passing the blower warming core 80 and the heater 70 is formed via the first outer valve ports B2 and B1; A sixth heat exchange medium loop passing the heater 70 and the chiller 60 is formed through the third and first outer valve ports B3 and B1.

Preferably, the chiller 60 includes a first fluid path 62, a fluid path 64 and a third fluid path 66. The first channel 62 and the second channel 64 are configured for flow of the heat exchange medium. The first channel 62 is connected between the third outer valve port B3 and one of the input ports of the third tee joint. The second channel 64 is connected in series between one of the output ports of the second tee joint and the fifth inner valve port A5; The third fluid path 66 is provided for flow of the refrigerant, which is connected with the refrigerant pipeline of an air-conditioning compressor.

In one work state where the third heat exchange medium loop and the sixth heat exchange medium loop are enabled simultaneously, the heat exchange medium in the sixth heat exchange medium loop absorbs the heat generated by the heater 70 and releases heat in the first fluid path 62 of the chiller 60; The heat exchange medium in the third heat exchange medium loop absorbs heat in the second fluid path 64 of the chiller 60, and then the heat is transferred to the battery 50. In other words, the battery 50 is heated by the heater 70 to help the vehicle to state at low environmental temperature.

In one work state where the third heat exchange medium loop is enabled but the sixth heat exchange medium loop are disabled, the heat exchange medium in the third heat exchange medium loop absorbs the heat generated by the battery 50 and releases heat in the second fluid path 64 of the chiller 60. The refrigerant in the third fluid path 66 system absorbs the heat, thereby helping to cool the battery 50. Therefore, the battery 50 can be prevented from over-heat for safety.

In some embodiments, the chiller 60 may be made up of two heat exchanging units, and one of the heat exchanging units is provided with the first channel 62 and the second channel 64 for heating the battery 50; The other one of the heat exchanging units is provided with the second channel 64 and the third channel 66 for cooling the battery 50.

Figure 18:
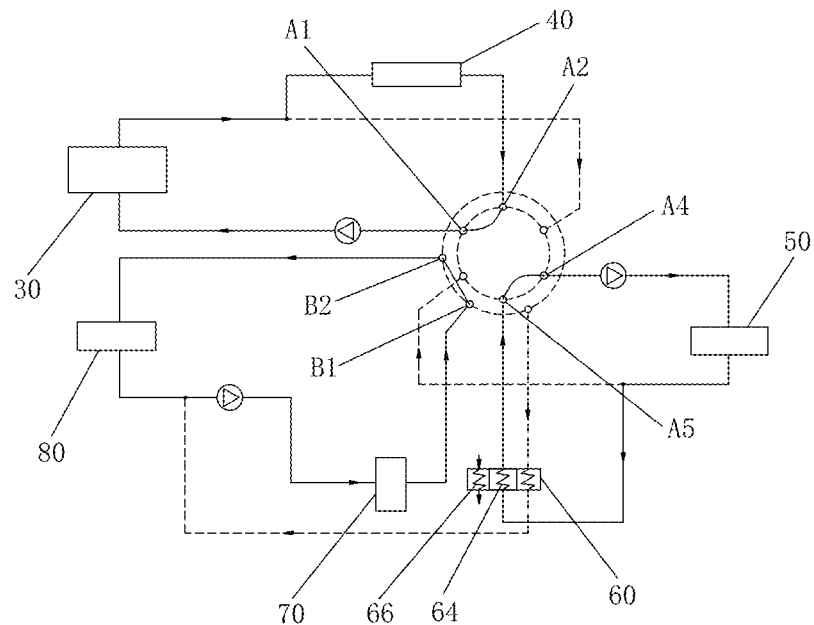
FIG. 18 is a schematic diagram to illustrate on/off statues of the fluid circuits of the thermal management system when the valve in the first work state.

Referring to FIG. 18, when the thermal management system 100 is in a first work mode with the valve 10 switched to the first work state, the first heat exchange medium loop is enabled, but the second heat exchange medium loop is disabled. The heat generated by the traction motor 30 is transferred to the radiator 40 to be dissipated there through flow of heat exchange medium, therefore the traction motor 30 is cooled. At the same time, the third heat exchange medium loop is enabled, but the fourth heat exchange medium loop is disabled. The heat generated by the battery 50 is taken away by the flow of heat exchange medium and is released to the refrigerant in the chiller 60, therefore, the battery 50 is cooled; At the same time, the fifth heat exchange medium loop is enabled, but the sixth heat exchange medium loop is disabled. The heat generated by the heater 70 is transferred to the blower warming core 80 through the flow of heat exchange medium, and then the passenger cabinet is warmed. In FIG. 18-23, a solid line indicates the enabled heat exchange medium loop and a dotted line indicates a disabled heat exchange medium loop.

Figure 19:
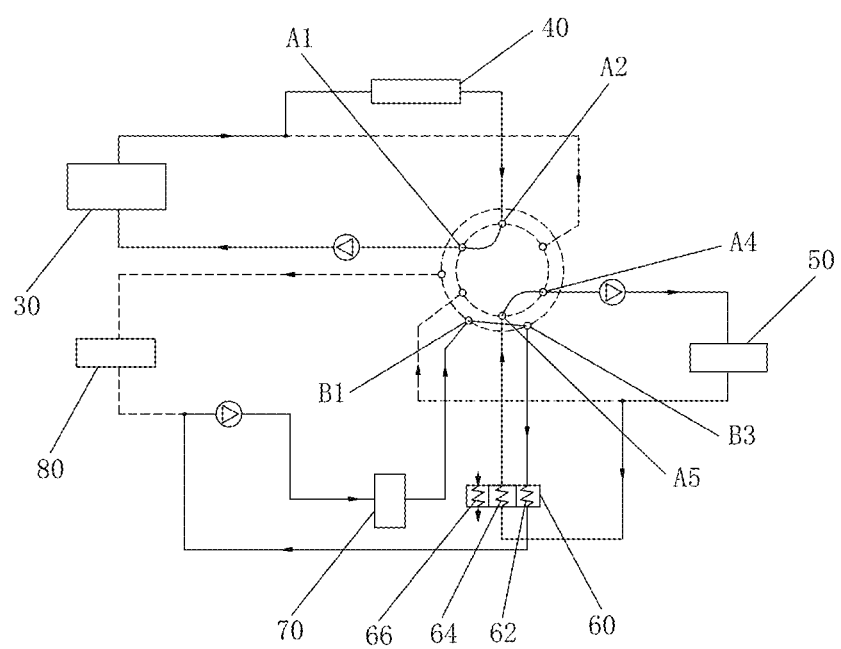
FIG. 19 is a schematic diagram to illustrate on/off statues of the fluid circuits of the thermal management system when the valve in the second work state.

Referring to FIG. 19, when the thermal management system 100 is in the second work mode with the valve 10 switched to the second work state, the first heat exchange medium loop is enabled, but the second heat exchange medium loop is disabled. The heat generated by the traction motor 30 is transferred to the radiator 40 to be dissipated with flow of heat exchange medium, therefore the traction motor 30 is cooled; At the same time, the third heat exchange medium loop and the sixth heat exchange medium loop are enabled, but the fourth heat exchange medium loop and the fifth heat exchange medium loop are disabled. The heat of heater 70 is taken away by the flow of heat exchange medium which has heat exchanging with the heat exchange medium in the third heat exchange medium loop when flowing through the chiller 60. Therefore, the battery 50 is heated rapidly. In the second work mode, the passenger cabinet is not be warmed.

Figure 20:
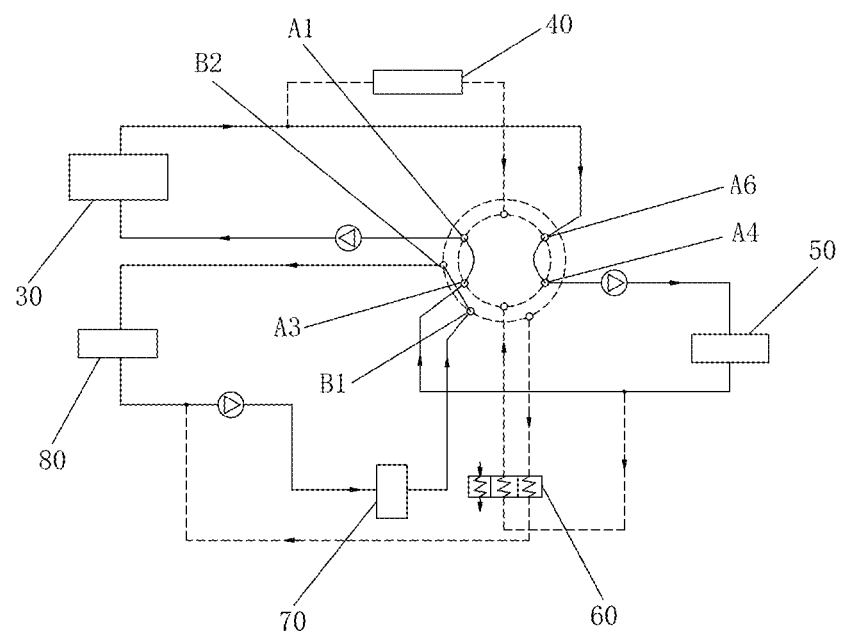
FIG. 20 is a schematic diagram to illustrate on/off statues of the fluid circuits of the thermal management system when the valve in the third work state.

Referring to FIG. 20, when the thermal management system 100 is in a third work mode with the valve 10 switched to the third work state, the first heat exchange medium loop and the third heat exchange medium loop are disabled, and the second heat exchange medium loop, the fourth heat exchange medium loop are connected in series and enabled. the heat generated by the traction motor 30 is utilized to heat battery 50, which help to make full use of energy; At the same time, the fifth heat exchange medium loop is enabled, but the sixth heat exchange medium loop is disabled. The heat generated by the heater 70 is utilized to warn the passenger cabinet.

Figure 21:
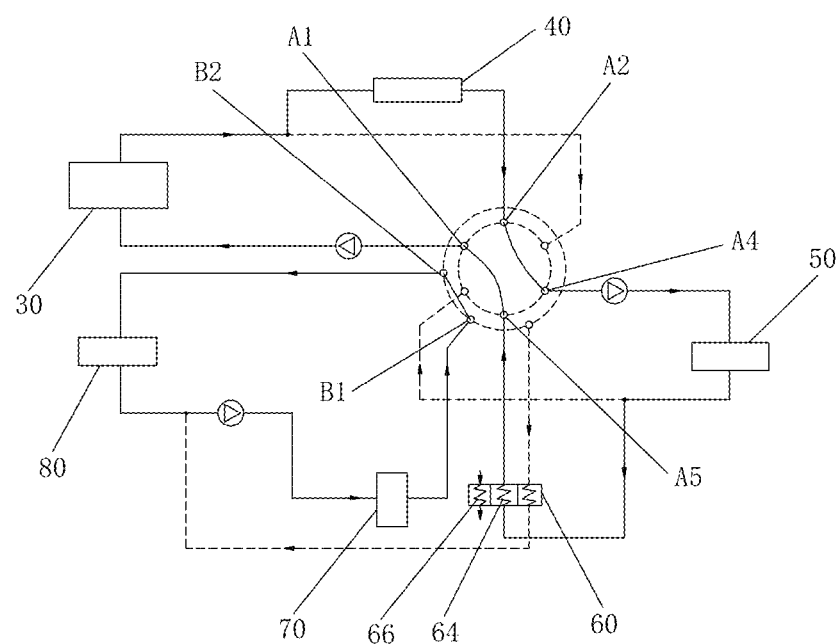
FIG. 21 is a schematic diagram to illustrate on/off statues of the fluid circuits of the thermal management system when the valve in the fifth work state.

As shown in FIG. 21, when the thermal management system 100 is in a fourth work mode with the valve 10 switched to the fifth work state, the first heat exchange medium loop, the third heat exchange medium loop are connected in series and enabled, the second heat exchange medium loop and the fourth heat exchange medium loop are disabled. The battery 50 and the traction motor 30 are cooled by the chiller 60, within which heat exchanging between the heat exchange medium and the refrigerant occurs. At the same time, the fifth heat exchange medium loop is enabled, but the sixth heat exchange medium loop is disabled. The heat generated by the heater 70 is utilized to warn the passenger cabinet.

Figure 22:
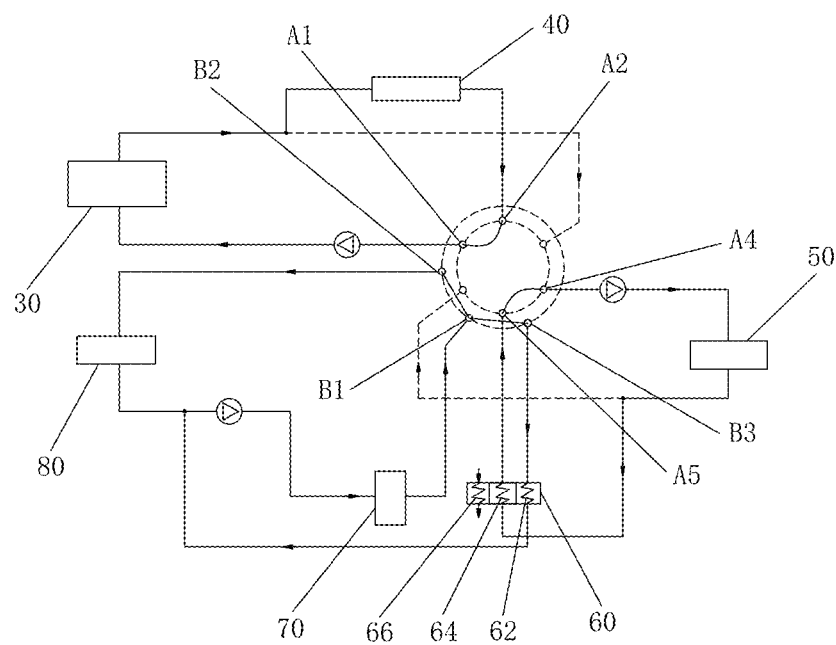
FIG. 22 is a schematic diagram to illustrate on/off statues of the fluid circuits of the thermal management system when the valve in the sixth work state.

Referring to FIG. 22, when the thermal management system 100 is in a fifth work mode with the valve 10 switched to the sixth work state, the first heat exchange medium loop is enabled, but the second heat exchange medium loop is disabled. The heat generated by the traction motor 30 is transferred to the radiator 40 to be dissipated there through flow of heat exchange medium, therefore the traction motor 30 is cooled. At the same time, the third heat exchange medium loop, the fifth heat exchange medium loop and the sixth heat exchange medium loop are enabled, but the fourth heat exchange medium loop is disabled. Part of the heat generated by heater 70 is utilized to heat battery 50 through the heat exchange within the chiller 60, and other part of heat is utilized to warm the passenger cabinet through the blower warming core 80.

When the thermal management system 100 is in a fifth work mode, according to changes in demand, the position of the vale core 14 can be adjusted between the first position and the second position of the valve core 14 to change a ratio of the overlapping area between the first outer valve port B1 and the second outer valve port B2 to that between the first outer valve port B1 and the third outer valve port B3. As a result, the flow ratio of the heat exchange medium via the second outer valve port B2 and the third outer valve port B3 is adjustable, and a ratio of heat supply to the battery 50 and the passenger compartment is adjustable. For example, when it is required to increase the heat supply of the passenger cabinet, the valve core 14 is rotated to increase the overlapping area of the first outer valve port B1 and the second outer valve port B2; On the contrary, when more heat should be supplied to the battery 50, the valve core 14 is rotated to reduce the overlapping area of the first outer valve port B1 and the second outer valve port B2, but increase the overlapping area of the first outer valve port B1 and the third outer valve port B3 accordingly.

Figure 23:
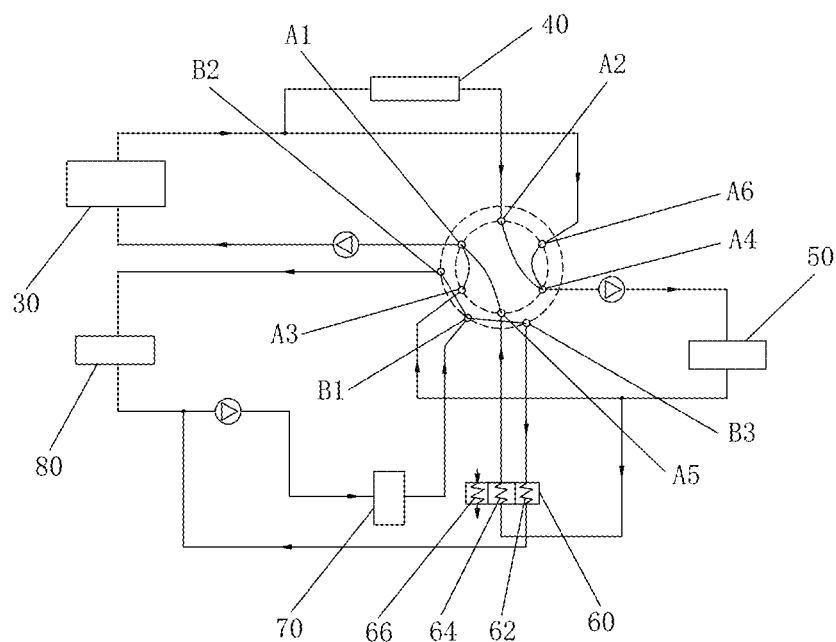
FIG. 23 is a schematic diagram to illustrate on/off statues of the fluid circuits of the thermal management system when the valve in the seventh work state.
Figure 24:
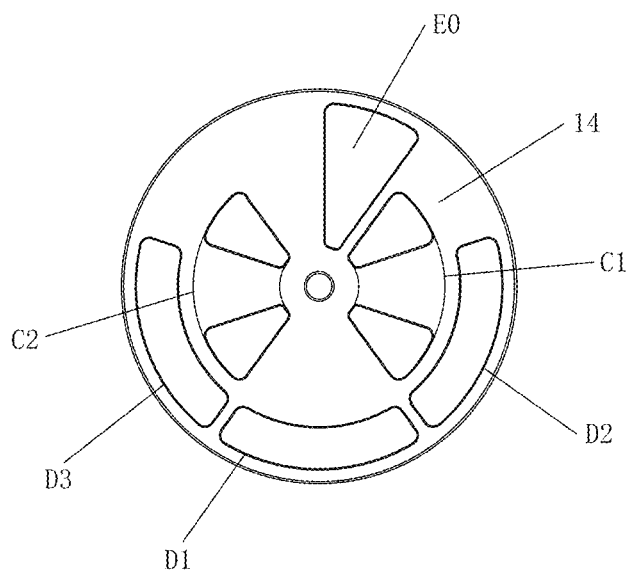
FIG. 24 is a schematic diagram of the flow channel of the valve core according to a second embodiment of the present application.

Referring to FIG. 23, when the thermal management system 100 is in a sixth working state with the valve 10 switched to the seventh work state, the first heat exchange medium loop, the second heat exchange medium loop, the third heat exchange medium loop, the fourth heat exchange medium loop the fifth heat exchange medium loop and the sixth heat exchange medium loop are all enabled. The first heat exchange medium loop and the second heat exchange medium loop are respectively connected in series with the third heat exchange medium loop and the fourth heat exchange medium loop. In this work mode, it is convenient for heat exchange medium filling, and inspection and maintenance of the thermal management system 100.

The thermal management system 100 provided in the present application is equipped with the valve 10 with a plurality of inner valve ports A1~A6 and a plurality of external valve ports B1~B3. The connections among the inner valve ports A1~A6 through the inner flow channels C1 and C2 are switchable. At the same time, the connections among the outer valve ports B1~B3 through the outer flow channels D1~D3 are switchable. The inner flow channels C1, C2 and the outer flow channels D1~D3 are not in fluid communicating with one another within the valve core 14. Each of the inner valve ports A1~A6 cannot be connected to any of the outer valve ports B1~B3. So that, the valve 10 are configured to be connected with a plurality of fluid circuits of thermal management system 100 and enable a variety of working modes of the thermal management system 100. That is, an on-off status and flow rate of heat exchange medium through each of the fluid circuits is adjustable to meet the heat exchange demand under various work conditions. For example, it can be applied to an electric vehicle to meet cooling demand of traction motor 30, heating or cooling demand of battery 50, heating or cooling demand of passenger cabinet etc, and then bring improvement in both of comfort for riding, and safety for the electric vehicle.

FIGS. 24-27 show a valve core 14 of the valve 10 according to another embodiment of the present application. The valve core 14 includes inner flow channels C1, C2, outer flow channels D1~D3 and a shared flow channel E0. The shared flow channel E0 is also sector-annular, with a diameter equal to the inner diameter of the inner flow channel C1 and C2, and an outer diameter equal to that of the outer flow channel D1~D3. The shared flow channel E0 extends radially through both of the circles on which the inner flow channel C1, C2 are located and the outer flow channel D1~D3 are located and can enable an interconnection between selected one of the inner valve ports A1~A6 and one of the outer valve ports B1~B3 of the valve house 12. In the illustrated embodiment, the shared flow channel E0 is arranged between the first and second inner flow channels C1 and C2.

Figure 25:
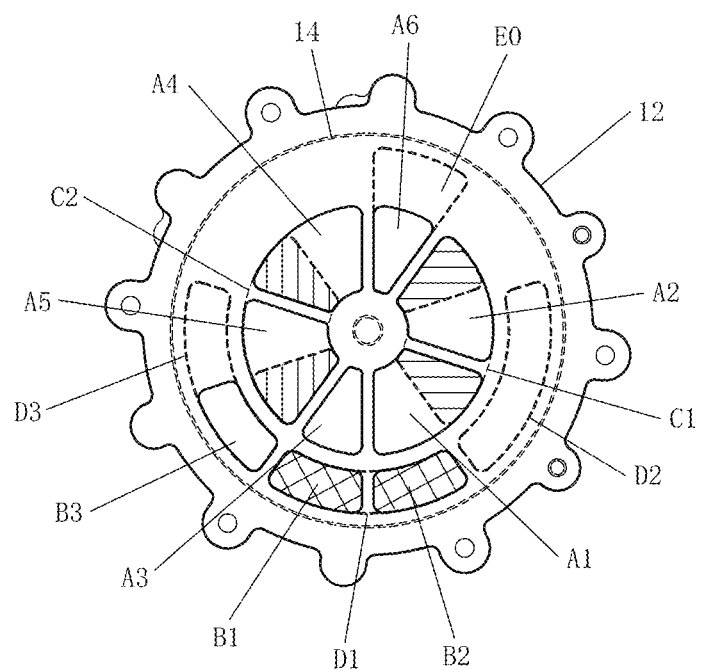
FIG. 25 is a schematic diagram to illustrate the position relationship between the valve core and valve house in FIG. 24 in one work state.

Referring to FIG. 25, the valve 10 is in one of the work states of the valve 10 similar to that of the first embodiment, the first inner flow channel C1 is aligned and in communication with both of the first and second inner valve ports A1 and A2; The second inner flow channel C2 is aligned and in communication with both of the fourth and fifth inner valve ports A4 and A5; The first outer flow channel D1 is aligned and in communication with both of the first and second outer valve ports B1 and B2. The radial inner part of the shared flow channel E0 is aligned and in communication with the sixth inner valve port A6 and the radial outer part is misaligned with any of the outer valve ports B1~B3. In other words, the general flow channel E0 does not interconnect different valve ports.

Figure 26:
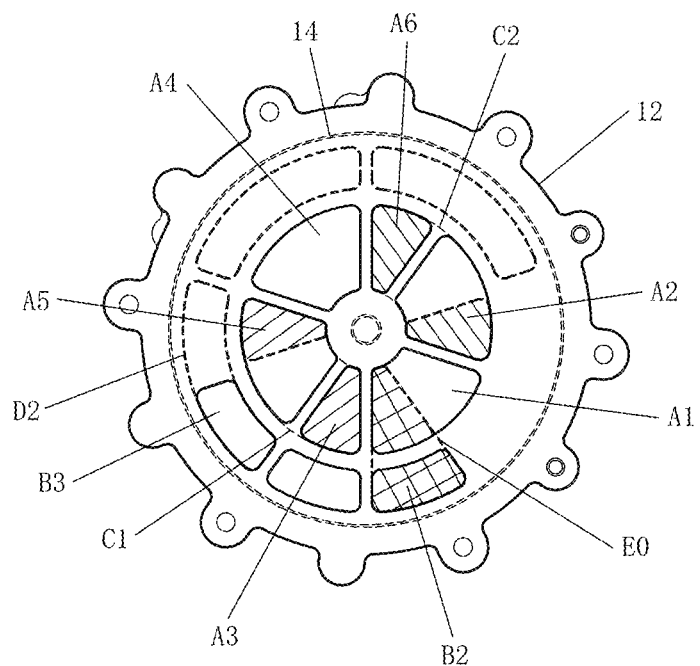
FIG. 26 is a schematic diagram to illustrate the position relationship between the valve core and valve house of the valve in FIG. 24 in another one work state.

Referring to FIG. 26, the valve 10 is in another one of the work states of the valve 10. The first inner flow channel C1 is aligned and in communication with both of the third and firth inner valve ports A3 and A5; The second inner flow channel C2 is aligned and in communication with both of the sixth and second inner valve ports A6 and A2; The shared flow channel E0 is aligned and in communication with the first inner valve port A1 and the second outer valve port B2.

Figure 27:
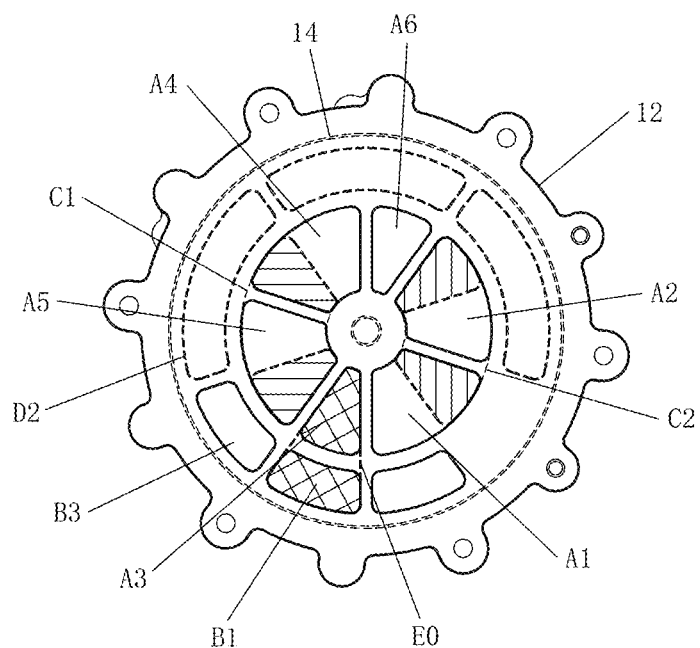
FIG. 27 is a schematic diagram to illustrate the position relationship between the valve core and valve house of the valve in FIG. 24 in further another one work state.

Referring to FIG. 27, the valve 10 is in further another one of the work states. The first inner flow channel C1 is aligned and in communication with both of the fourth and fifth inner valve ports A4 and A5; The second inner flow channel C2 is aligned and in communication with the first and second inner valve ports A1 and A2. The shared flow channel E0 is aligned and in communication with the third inner valve port A3 and the first outer valve port B1. It should be understood that the valve 10 of the present embodiment can be switched among different work states to enable different interconnection among the inner valve ports A1~A6 and/or external valve ports B1~B3. Therefore, the thermal management system 100 has a variety of different working modes, which are not listed herein.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A valve comprising a valve house and a valve core rotatably mounted in the valve house, wherein
a plurality of inner valve ports and a plurality of outer valve ports are defined in an axial end of the valve house; the inner valve ports are arranged at intervals along a circumferential direction of the valve house, the outer valve ports are arranged at intervals along a circumferential direction of the valve house; the inner valve ports are located on a radial inner side of the outer valve ports; the valve core defines a plurality of inner flow channels and a plurality of outer flow channels extending through one of two axial ends of the valve core facing the end of the valve house with the inner/outer valve ports and prevented from liquid communication at the other one axial end; the inner flow channels are located at a radial inner side of the outer flow channels, and are not in communication with each other inside the valve core, each of the inner flow channels is configured to overlap and communicate with two of the inner valve ports in an axial direction to enable the two inner valve ports to be interconnected with each other, each of the outer flow channels is configured to overlap and communicate with two of the outer valve ports in the axial direction to enable the two outer valve ports to be interconnected with each other; in response to the valve core rotating to different positions relative to the valve house, the inner flow channels selectively communicate with different inner valve ports, and the outer flow channel selectively communicate with different outer valve ports.

2. The valve of claim 1, wherein the plurality of inner flow channels comprises two inner flow channels, the plurality of inner valve ports comprises six inner valve ports, each inner flow channel is configured to enable two or three of the inner valve ports to be interconnected with one another.

3. The valve of claim 1, wherein the plurality of outer flow channels comprises three outer flow channels, the plurality of outer valve ports comprises three outer valve ports, each outer flow channel is configured to enable two or three of the inner valve ports to be interconnected with one another.

4. The valve of claim 1, wherein each of the inner valve ports and outer valve ports is sector-annular, and each of the inner flow channels and outer flow channels is sector-annular; all of the inner valve ports are arranged on a circle, and all of the outer valve ports are arranged on a circle; all of the inner flow channels are arranged on a circle which overlaps axially with the circle where the inner valve ports are located, and all of the outer flow channels are arranged on a circle, which overlaps axially with the circle where the outer valve ports are located.

5. The valve of claim 4, wherein a circumferential width of each of the outer flow channels is 2 times that of each of the outer valve ports; a circumferential width of each of the inner flow channels is 3 times that of each of the outer valve ports; a circumferential width of one of the inner valve ports is equivalent to that of the outer valve ports, and a width of another one of the inner valve ports is 2 times that of the outer valve ports.

6. The valve of claim 4, wherein the valve core further comprises a shared flow channel E0, and the shared flow channel extends radially through both of the circles on which the inner flow channel and the outer flow channel are respectively located and is configured to enable a fluid communication between selected one of the inner valve ports and one of the outer valve ports.

7. The valve of claim 4, wherein the valve core defines a first air hole and a second air hole, the first air hole is located on the circle where the inner flow channels are located and communicates with one of the inner flow channels, and the second air hole is located on the circle where the outer flow channel are located and communicates with one of the outer flow channels.

8. The valve of claim 1, wherein a dynamic friction ring is mounted to an axial end of the valve core, a static friction ring is installed inside the valve house, the dynamic friction ring and the static friction ring axially abuts against each other to form a dynamic seal therebetween.

9. A thermal management system, comprising a first fluid circuit, a second fluid circuit, a third circuit and the valve of claim 1, wherein the first fluid circuit is connected to at least two of inner valve ports of the valve; the second fluid circuit is connected to at least two of the inner valve ports of valve, but different from the inner ports connected to the first fluid circuit; the third circuit is connected to at least two of the outer valve ports of the valve.

10. The thermal management system of claim 9, wherein,
a traction motor and a radiator are connected in series in the first fluid circuit, an inlet of the traction motor is defined as a first inlet of the first fluid circuit, an outlet of the radiator is defined as a first outlet of the first fluid circuit; the first inlet and the first outlet of the first fluid circuit are respectively connected to two of the inner valve ports of the valve;
a battery and a chiller are connected in series in the second fluid circuit, an inlet of the battery is defined as a second inlet of the second fluid circuit, an outlet of the chiller is defined as a second outlet of the second fluid circuit; the second inlet and the second outlet of the second fluid circuit are respectively connected to two of the inner valve ports, but different from the inner valve ports connected to the first fluid circuit;
a heater and a blower warming core are connected in series in the third fluid circuit, an inlet of the heater is defined as a third inlet of the third circuit, an outlet of blower warming core is defined as a third outlet of the third circuit; the third inlet and the third outlet of the third circuit are respectively connected to two of the outer valve ports of the valve.

11. The thermal management system of claim 10, wherein,
a first tee joint is arranged between an outlet of the traction motor and an inlet of the radiator, input and output ports of the first tee joint is connected to three of the inner valve ports of valve respectively;

a second tee joint is arranged between an outlet of the battery and an inlet of the chiller, input and output ports of the second tee joint are connected to other three inner valve ports of the valve respectively;

a third tee joint is arranged between the outlet of the heater and the inlet of the blower warming core, input and output ports of the third tee joint are respectively connected two the three outer valve ports of the valve.

12. The thermal management system of claim 11, wherein the chiller is provided with a first fluid path, a second fluid path and a third fluid path; the first fluid path is connected between the third tee joint and the corresponding outer valve port of the valve; the second fluid path is connected between the second tee joint and the corresponding one of the inner valve ports; the third fluid path is provided for flow of refrigerant.

13. The thermal management system of claim 12, wherein the chiller is made up of two heat exchanging units, one of which is provided with the first fluid path and the second fluid path, and the other one is provided with the second fluid path and the third fluid path.

14. The thermal management system of claim 11, wherein, the plurality of inner valve ports comprises a first inner valve port, a second inner valve port, a third inner valve port, a fourth inner valve port, a fifth inner valve port and a sixth inner valve port, the first inner valve port is located between the second inner valve port and the third inner valve port in a circumferential direction, and the fourth inner valve port is located between the fifth inner valve port and the sixth inner valve port in a circumferential direction;

the plurality of outer valve ports comprises a first outer valve port, a second outer valve port and a third outer valve port, and the first outer valve port is located between the second outer valve port and the third outer valve port in a circumferential direction;

the first inlet, the first outlet of the first fluid circuit and the first tee joint are directly connected to the first inner valve port, the second inner valve port and the sixth inner valve port, respectively;

the second inlet, the second outlet of the second fluid circuit and the second tee joint are directly connected to the fourth inner valve port, the fifth inner valve port and the third inner valve port, respectively;

the third inlet and the third outlet of the third fluid circuit are respectively connected to the second outer valve port and the first outer valve port, and the third tee joint is connected to the third outer valve port through the chiller.

15. The thermal management system of claim 14, wherein the thermal management system is configured to be switched among at least the following:

a first work mode, wherein the first inner valve port of the valve is in fluid communication with the second inner valve port, and the fourth inner valve port is in communication with the fifth inner valve port, and the first outer valve port is in communication with the second outer valve port;

a second work mode, wherein the first inner valve port of the valve is in fluid communication with the second inner valve port, and the fourth inner valve port is in fluid communication with the fifth inner valve port, and the first outer valve port is in fluid communication with the third outer valve port;

a third working state, wherein the first inner valve port of the valve is in fluid communication with the third inner valve port, and the fourth inner valve port is in fluid communication with the sixth inner valve port, and the first outer valve port is in fluid communication with the second outer valve port;

a fourth work mode, wherein the first inner valve port of the valve is in fluid communication with the fifth inner valve port, the fourth inner valve port is in fluid communication with the second inner valve port, and the first outer valve port is in fluid communication with the second outer valve port;

a fifth work mode: wherein the first inner valve port of the valve is in fluid communication with the second inner valve port, the fourth inner valve port is in fluid communication with the fifth inner valve port, and the first outer valve port is in fluid communication with both of the second outer valve port and the third outer valve port simultaneously;

a sixth work mode, wherein the first inner valve port is in fluid communication with both of the third inner valve port and the fifth inner valve port of the valve simultaneously; the fourth inner valve port is in fluid communication with both of the second inner valve port and the sixth inner valve port simultaneously; the first outer valve port is in fluid communication with both of the second outer valve port and the third outer valve port simultaneously.

16. The thermal management system of claim 15, wherein a flow ratio via the second outer valve port and the third outer valve port are adjustable in response to the first outer valve port is in fluid communication with both of the second outer valve port and the third outer valve port simultaneously.

* * * * *